United States Patent
Zhang et al.

(10) Patent No.: US 9,166,776 B2
(45) Date of Patent: Oct. 20, 2015

(54) METHODS AND SYSTEMS FOR OPTIMAL PN PHASE DETECTION IN DTMB RECEIVERS

(71) Applicant: Amlogic Co., Ltd., Santa Clara, CA (US)

(72) Inventors: Jinhong Zhang, Santa Clara, CA (US); Guogang Li, Shanghai (CN)

(73) Assignee: Amlogic Co., Ltd., Santa Clara, CA (US)

( * ) Notice: Subject to any disclaimer, the term of this patent is extended or adjusted under 35 U.S.C. 154(b) by 0 days.

(21) Appl. No.: 14/046,065

(22) Filed: Oct. 4, 2013

(65) Prior Publication Data
US 2015/0098529 A1 Apr. 9, 2015

(51) Int. Cl.
H03K 9/00 (2006.01)
H03D 1/04 (2006.01)
H04L 27/06 (2006.01)
H04L 7/04 (2006.01)

(52) U.S. Cl.
CPC ..................................... *H04L 7/043* (2013.01)

(58) Field of Classification Search
USPC ......... 375/219, 220, 222, 316, 324, 339, 338, 375/340, 344, 342, 346, 371, 363, 362, 364, 375/366, 354, 240.26–240.27, 284, 285, 375/278, 295; 370/215, 210, 203
See application file for complete search history.

(56) References Cited

U.S. PATENT DOCUMENTS

| | | | |
|---|---|---|---|
| 6,549,561 B2* | 4/2003 | Crawford | 375/137 |
| 7,529,295 B1* | 5/2009 | Nezami | 375/226 |
| 7,715,484 B2* | 5/2010 | Chen et al. | 375/260 |
| 2005/0201449 A1* | 9/2005 | Churan | 375/149 |
| 2008/0049600 A1* | 2/2008 | Liu | 370/208 |
| 2009/0135977 A1* | 5/2009 | Sheu | 375/371 |
| 2009/0225813 A1* | 9/2009 | Im | 375/141 |
| 2010/0203885 A1* | 8/2010 | Chen et al. | 455/434 |
| 2011/0013729 A1* | 1/2011 | Yuba et al. | 375/329 |
| 2013/0136165 A1* | 5/2013 | Shirakata et al. | 375/226 |

* cited by examiner

*Primary Examiner* — Linda Wong
(74) *Attorney, Agent, or Firm* — Venture Pacific Law, PC

(57) ABSTRACT

A method and system for pseudorandom noise ("PN") phase detection in digital terrestrial multimedia broadcast ("DTMB") receivers. This method selects a detection range of symbols from a frame of the received signal; applies FFT to the PN portion of each of the symbols in the detection range to generate $H_n(k)$; applies phase rotation to $H_n(k)$ to obtain phase rotated $\widetilde{H_n}$ for the PN portion of the symbols in the detection range; applies differential operations to $\widetilde{H_n}$ to generate $H_p^d$; sums the $H_p^d$ to generated $H_{sum}$; calculates a value Q as a function of $H_{sum}$; and determines the PN phase offset as a function of Q and a predefined threshold.

20 Claims, 7 Drawing Sheets

METHODS AND SYSTEMS FOR OPTIMAL PN PHASE DETECTION IN DTMB RECEIVERS

FIELD OF INVENTION

This invention generally relates to methods and systems digital TV receivers, and, in particular, to methods and systems for detecting pseudorandom noise phases in the decoding of symbols in Digital Terrestrial Multimedia Broadcast ("DTMB") receivers.

BACKGROUND

DTMB is the digital TV standard for mobile and fixed terminals used in the People's Republic of China, Hong Kong, and Macau. In DTMB systems, instead of a cyclic prefix, a PN sequence precedes each DTMB symbol acting as a guard interval and as pilots for the symbol. As specified by the DTMB standard, all of the PN sequences have the same generator polynomial, but their initial phase offsets are periodically varied. FIG. 1 illustrates initial phase offsets for the PN sequences for symbols in a DTMB frame where on the horizontal axis are the PN indices and on the vertical axis are the PN phase offsets for the given PN indices.

The PN sequence is used to aid estimating frequency offset and sampling frequency offset, and in channel estimation, the PN sequence is used to remove inter-symbol-interference ("ISI"). Generally speaking, the PN sequence needs to be estimated beforehand because the PN phase is critical for the synchronization process of the DTMB receiver. However, in receiving a DTMB signal, the PN phase is not known because the PN phase for the symbols varies by the respective offset (relative to PN0) and the PN phase of the received symbols need to be determined. Due to the large payload that can be carried by DTMB signals, in the decoding process, the calculation of the PN phase must be efficient in order to efficiently process the DTMB signals. Thus, it is desirable to have an efficient PN phase detector for use in DTMB receivers.

SUMMARY OF INVENTION

An object of this invention is to provide methods and systems for detecting the PN phase of the received symbols in a DTMB receiver.

Another object of this invention is to provide methods and systems for detecting the PN phase of the received symbols from a selected range of symbols in a frame in order to minimize calculations and hardware implementation complexity.

Briefly, a method for PN phase detection of a received signal for a DTMB receiver are disclosed, wherein the received signal has a plurality of frames and each frame has a plurality of symbols and each of the symbols having a PN portion, wherein each PN portion having an initial phase offset designated from a plurality of initial phase offsets. The method comprises the steps of: selecting a detection range of symbols from a frame of the received signal; applying FFT to the PN portion of each of the symbols in the detection range to generate $H_n(k)$; applying phase rotation to $H_n(k)$ to obtain phase rotated $\widetilde{H_n}$ for the PN portion of the symbols in the detection range; applying differential operations to $\widetilde{H_n}$ to generate $H_p{}^d$; summing the $H_p{}^d$ to generated $H_{sum}$; calculating a value Q as a function of $H_{sum}$; and determining the PN phase offset as a function of Q and a predefined threshold.

An advantage of this invention is that it provides methods and systems for detecting the PN phase of the received symbols in a DTMB receiver.

Another advantage of this invention is that it provides methods and systems for detecting the PN phase of the received symbols from a selected range of symbols in a frame in order to minimize calculations and hardware implementation complexity.

DESCRIPTION OF THE DRAWINGS

The foregoing and other objects, aspects, and advantages of the invention can be better understood from the following detailed description of the preferred embodiment of the invention when taken in conjunction with the accompanying drawings.

DETAILED DESCRIPTION OF THE PREFERRED EMBODIMENTS

In a presently preferred method of the present invention, a method that estimates the PN phase in the frequency domain is disclosed (noting that the method also describes time domain realization but more computation power would be needed).

Figure 2:
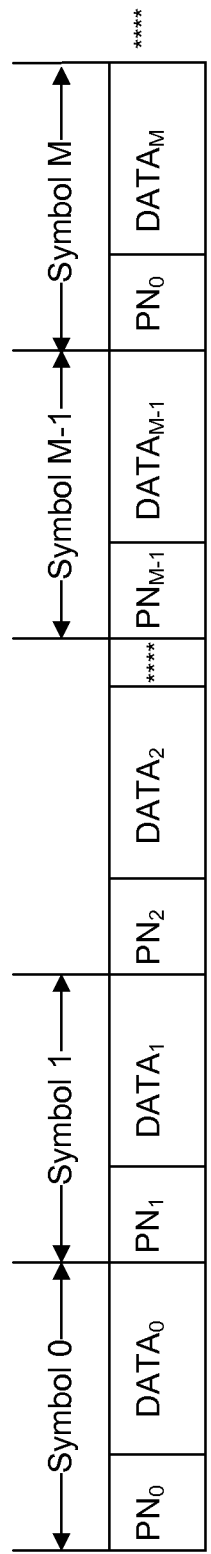
FIG. 2 illustrates a DTMB frame structure.

Here, referring to FIG. 2, a DTMB frame structure is illustrated where the PN sequence preceding each DTMB symbol are denoted as $PN_0$ to $PN_{M-1}$, where M is the total number of symbols in the DTMB frame. Typically, the PN initial offsets for the symbols are sequential, and they are prior known. Thus each of the symbols has its own PN phase and therefore its own initial phase offset.

The initial phases of $PN_m$ (m=0,1, ... M−1) relative to the phase of $PN_0$ are denoted as $OFF_m$ (m=0,1, ... M−1). OFF(m) is generated according to the DTMB specification, which specified that the PN sequences of m with initial phase offsets relative to $PN_0$. Let $x_{pn}$ be the PN signal after the channel and receiver front end, and let n be the OFDM symbol index, and k be the FFT output carrier index. Let R be the number of OFDM symbols in the detection range and such that there are R OFDM symbols used in PN phase detector.

Figure 3:
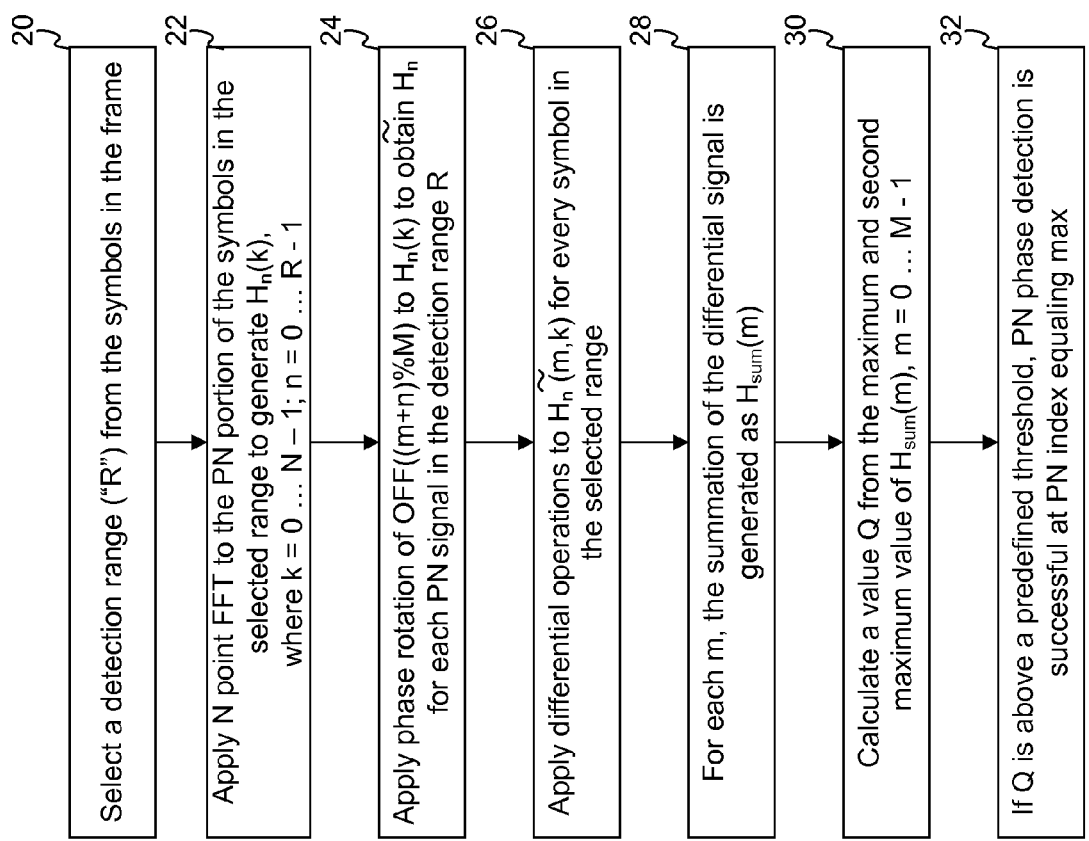
FIG. 3 shows a flowchart of the steps of the preferred method of the present invention.

Referring to FIG. 3, a preferred method for detecting the PN phases of the symbols in the detection range R is presented as follows:

(1) Selecting a range of symbols in the frame as the detection range (R) (step 20). By limiting the process to a selected range, the processing can be designed to be efficient and the hardware requirement can be reduced;

(2) Applying an N point FFT to each of the PN portion of the symbols in the selected range (an example of the application of FFT is provided by Equation 1) and denote it as $H_n$ (step 22), $$H_n(k) = \mathit{fft}(x_{pn}(n, 0:N-1)), \quad \text{[Equation 1]}$$

where k=0,1, ..., N-1; n=0,1, ..., R-1;

(3) Then a phase rotation of OFF((m+n) % M) is applied to $H_n$ (noting that "%" indicating the reminder function) and $\widetilde{H_n}$ is obtained for each PN signal in the detection range R (an example of the phase rotation is provided by Equations 2 and 3) (step 24):

$$c_n(m, k) = e^{-j*2*\pi*k*\frac{OFF((m+n)\% M)}{N}}, \quad \text{[Equation 2]}$$

where $n = 0, 1, \ldots, R-1$;
$k = 0, 1, \ldots, N-1; m = 0, 1, \ldots, M-1$;

$$\widetilde{H_n}(m, k) = H_n(k) * c_n(m, k), \quad \text{[Equation 3]}$$

where $m = 0, 1, \ldots, M-1$;
$n = 0, 1, \ldots, R-1$;

As shown by Equations 2 and 3, the phase rotation cycles through the phase offsets and is applied to all the symbols in the frame.

(4) A differential operation is applied to $\widetilde{H_n}(m, k)$ for the symbols in the selected range (an example of such differential operation is provided by Equation 4 as follows) (step 26):

$$H_p^d(m,k) = \widetilde{H_n}(m,k) * \widetilde{H_{p+1}}(m,k)^*, \quad \text{[Equation 4]}$$

where p=0 ,1, ..., R-2; m=0,1, ..., M-1;

(5) For each m, the summation of the differential signal is derived as $H_{sum}(m)$, an example of such summation is provided by Equation 5 as follows (step 28):

$$H_{sum}(m) = |(\Sigma_{p=0}^{R-2} \Sigma_{k=0}^{N-1} H_p^d(m,k))|, \quad \text{[Equation 5]}$$

where m=0,1, ..., M-1;

(6) A value Q (for "quality") is calculated from the maximum value of $H_{sum}(m)$ (this index indicated by "max") and second maximum value of $H_{sum}(m)$ (this index indicated by "secondmax"), and the value Q indicates the quality of the PN signal detection (step 30), where $$Q = \text{Max}(|H_{sum}|)/\text{SecondMax}(|H_{sum}|). \quad \text{[Equation 6]}$$

Figure 1:
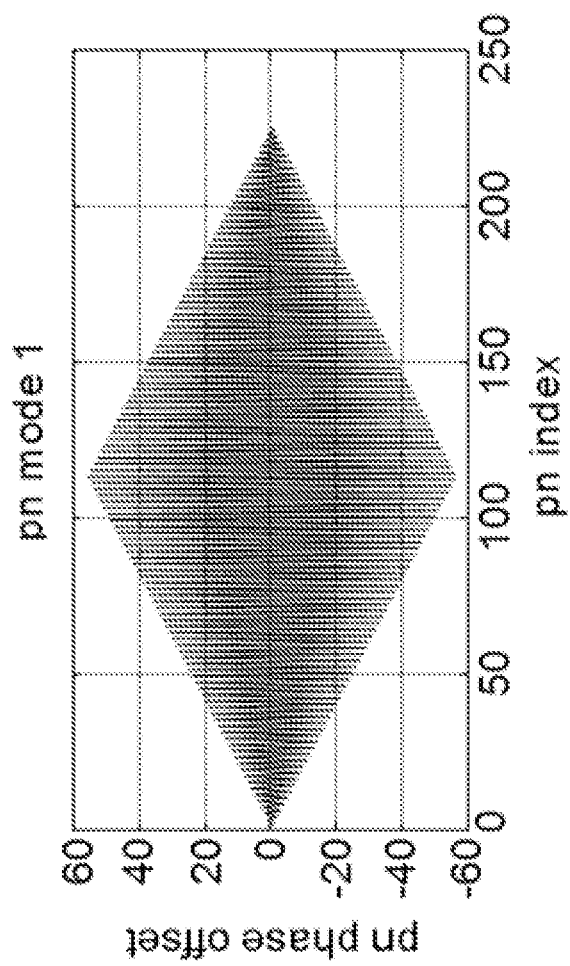
FIG. 1 illustrates the initial phase offsets of the PN sequences for the DTMB symbols in a frame.

If Q is above a predefined threshold, then PN phase detection is successful and the initial phase is detected at OFFSET (max), where max is the PN index for the corresponding initial phase offset (as shown in FIG. 1) (step 32). Note that the equation for calculation Q in this embodiment is a ratio between the maximum value of $H_{sum}$ and the second maximum value of $H_{sum}$. If this ratio is high, it indicates that there is a large spread between the maximum value and the second maximum value and therefore it is likely it is the phase for the symbol at PN index equaling to max. The predefined threshold is generally determined from empirical evidence.

Figure 4:
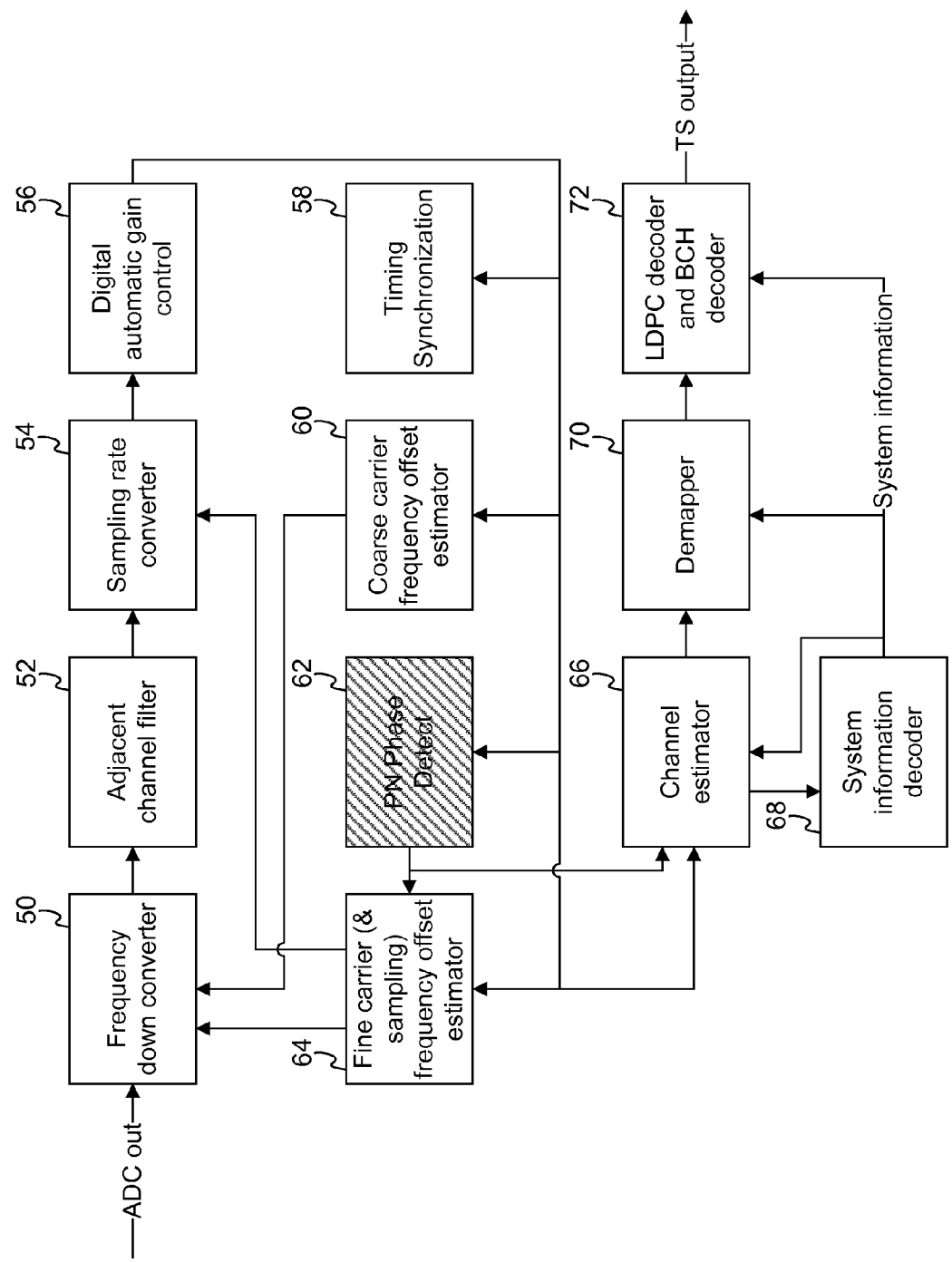
FIG. 4 illustrates an embodiment of the present invention in a DTMB receiver architecture.

FIG. 4 illustrates an embodiment of the present invention in a DTMB receiver architecture. Here, after analog-to-digital conversion of a received signal where the received signal is converted to a digital signal, the signal is down converted to the appropriate frequency for processing 50 and channel filtered 52. The signal is then converted to the proper sample rate 54 and automatically adjusted for gain control 56. The output is then provided to a timing synchronization block 58, a coarse carrier frequency offset estimator 60, and the PN phase detector 62, which is the focus of this application and the preferred embodiments are described above. The output from the PN phase detector is used by the fine carrier frequency offset estimator 64, which provides adjustments to the frequency down converter 50 and the sampling rate converter 54. The output from the PN phase detector is also used by the channel estimator 66, then demapped by the demapper 70, and then processed by the LDPC and BCH decoders 72. The system information decoder 68 uses information from the channel estimator 66 and provides decoded system information to be used by the channel estimator 66, the demapper 70, and the LDPC and BCH decoders 72, the output of which is the desired output signal.

Figure 5:
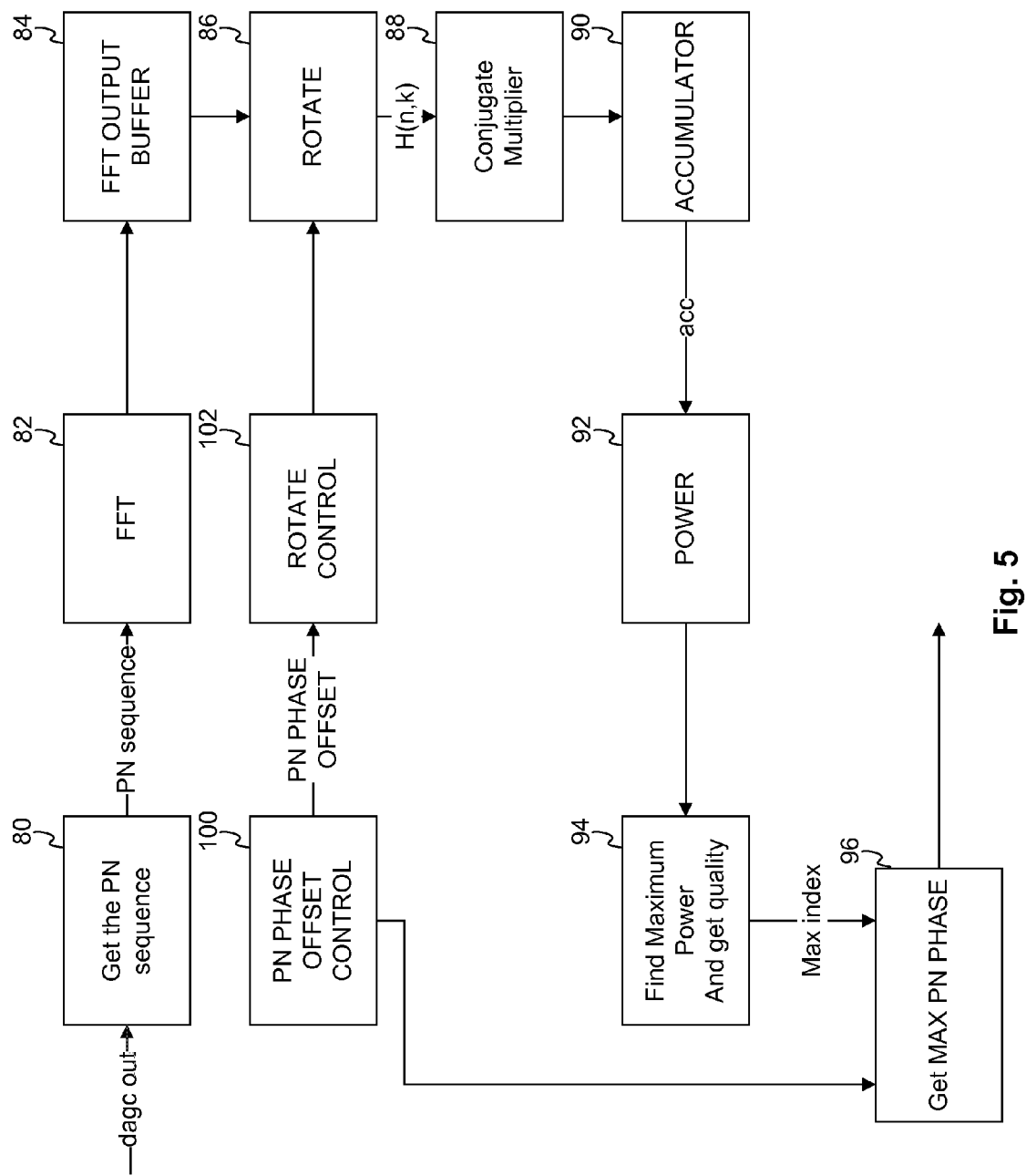
FIG. 5 illustrates a block diagram of the PN phase detector of the present invention.

FIG. 5 illustrates a block diagram of the PN phase detector of the present invention. Here, the received digital automatic gain controlled signal (dagc) is received as input. The PN sequence of the selected range of the symbols is obtained and FFT processed 82 and placed in a FFT output buffer 84. The PN phase offset control block 100, having the initial PN phase offset information, provides such information to the rotate control block 102 and the data in the FFT output buffer 84 is phase rotated 86 then the differential operation is applied via the conjugate multiplier block 88. The subsequent output is process by the accumulator 90 to obtain the summation of the differential signal; and such summation is used to obtain an interim value Q (or power 92). The maximum power is then determined and the associated index for such maximum power (max index) is then known 94. Such max index is the index of the offset of the initial phase for maximum PH phase. Once the initial phase offset (as indicated by max PN index) is known, the initial phase offset can then be determined 96.

Figure 6:
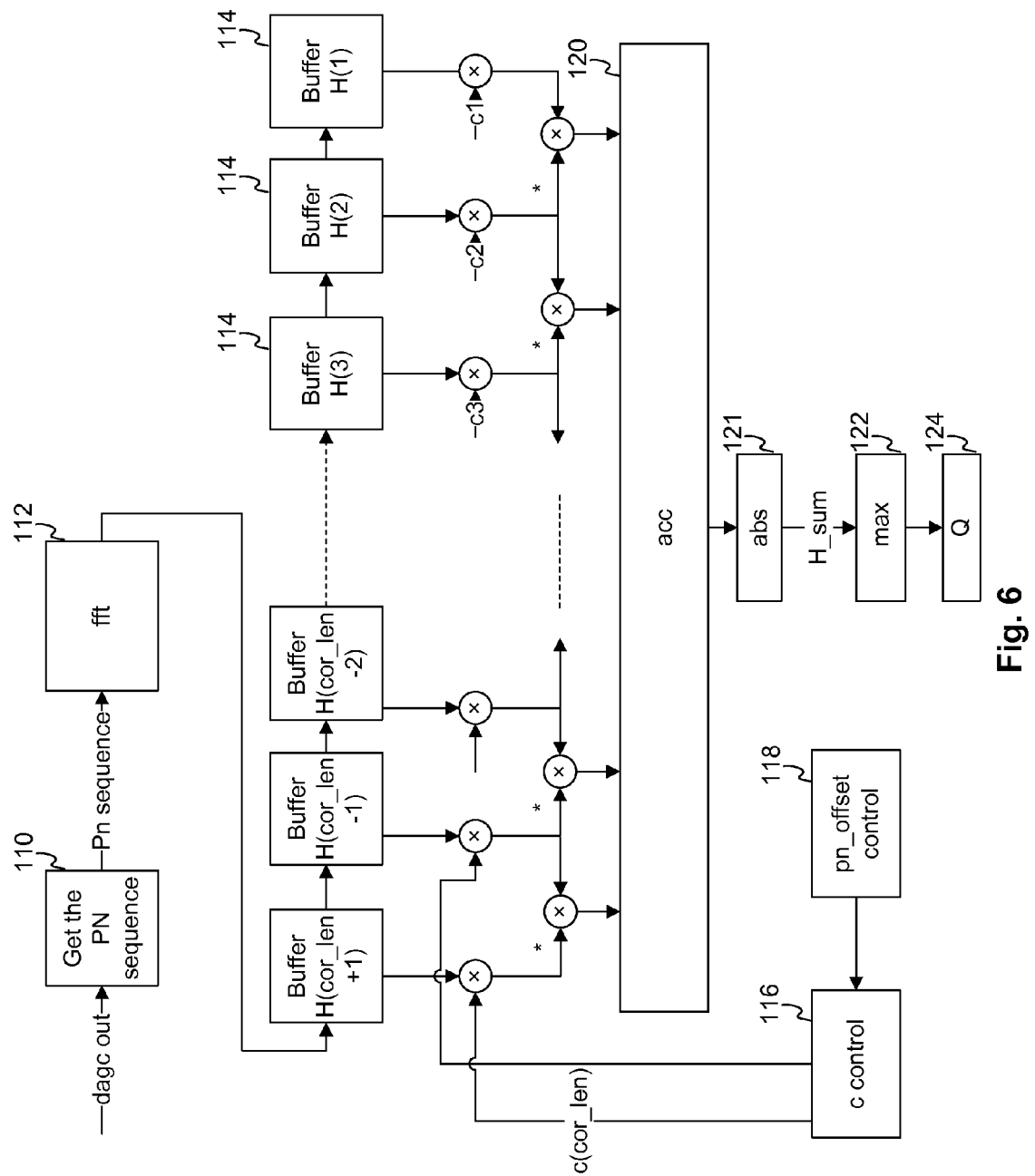
FIG. 6 illustrates a hardware block diagram of an embodiment of the PN phase detector of the present invention.

FIG. 6 illustrates a hardware block diagram of an embodiment of the PN phase detector of the present invention. Here, the post-dagc signal is received and the selected range of the PN sequence is obtained 110 and FFT is applied 112. The FFT processed data is then provided to a plurality of buffers 114 where phase rotation (through control block 116 which interacts with a pn_offset control block 118) is applied and differential operations are then applied (both of which are described by the methods above). The resulting data is provided to the accumulator 120 and summed. The desired absolute maximum values, 121 and 122, from the summation is obtained as the value Q 124.

Figure 7:
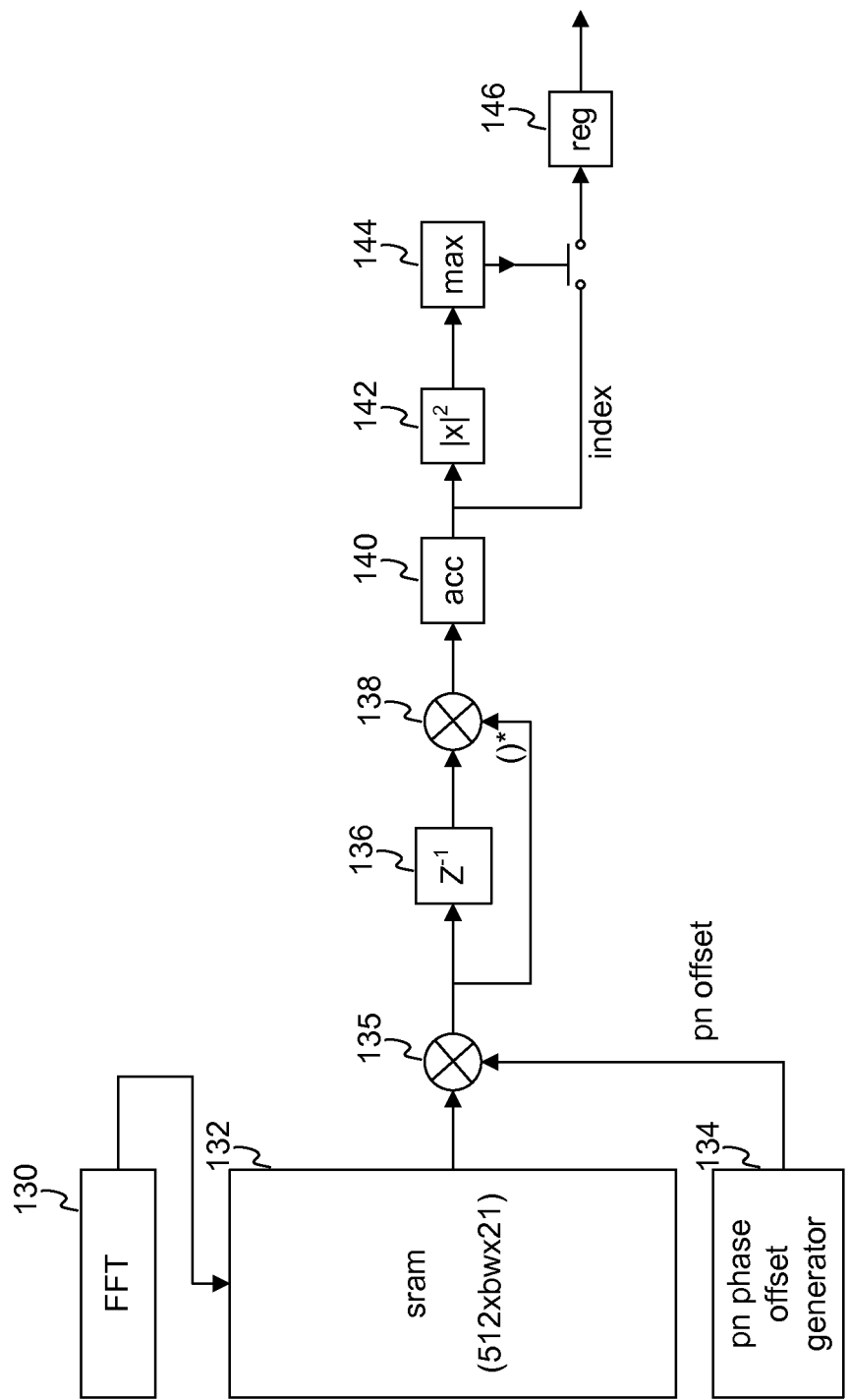
FIG. 7 illustrates a logic diagram of an embodiment of the PN phase detector of the present invention.

FIG. 7 illustrates a logic diagram of an embodiment of the PN phase detector of the present invention. Here, the received signal (within the selected range) is FFT processed 130 and the resulting data is placed in memory (sram) 132. The data is then phase rotated 135 (with information from the PN phase offset generator 134), then differential operation applied 136, and conjugated 138. The result is provided to the accumulator 140 where the power 142 is determined and the maximum of such power determined 144.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred apparatuses, methods, and systems described herein, but all those other and further alterations and modifications as would be apparent to those of ordinary skilled in the art.

We claim:

1. A method for pseudorandom noise ("PN") phase detection of a received signal by a PN phase detector for a digital terrestrial multimedia broadcast ("DTMB") receiver, wherein the received signal has a plurality of frames and each frame of the plurality of frames has a plurality of symbols and each symbol of the plurality of symbols having a PN portion, wherein each PN portion having an initial phase offset designated from a plurality of initial phase offsets (m), comprising the steps of:

selecting a detection range of symbols by the PN phase detector from a frame of the received signal;

applying fast-fourier transform ("FFT") to the PN portion of each of the symbols in the detection range to generate an FFT output $H_n(k)$;

applying phase rotation to the FFT output $H_n(k)$ to obtain a phase rotated output $\widetilde{H_n}$ for the PN portion of the symbols in the detection range;

applying differential operations to the phase rotated output $\widetilde{H_n}$ to generate a plurality of values $H_p^d$;

summing the plurality of values $H_p^d$ to generate a summation output $H_{sum}$; and calculating a quality value Q as a function of the summation output $H_{sum}$; and determining the PN phase offset by the PN phase detector as a function of the quality value Q and a predefined threshold, wherein the variables n,p,d, and k are integers.

2. The method of claim 1, wherein in the applying phase rotation step, the phase rotated output $\widetilde{H_n}$ (m,k) is determined as follows:

$$c_n(m,k) = e^{-j*2*\pi*k*\frac{OFF((m+n)\% \ M)}{N}},$$

where $n = 0, 1, \ldots, R-1$;

$k = 0, 1, \ldots, N-1; m = 0, 1, \ldots, M-1$; and $\widetilde{H_n}(m,k) = H_n(k) * c_n(m,k),$ where $m = 0, 1, \ldots, M-1$;

$n = 0, 1, \ldots, R-1.$ wherein the variables N,R, and M are integers, and wherein the function OFF( ) is a phase rotation.

3. The method of claim 1, wherein in the applying phase rotation step, the phase rotation of OFF((m+n) % M) is applied to the FFT output $H_n(k)$ for PN portions of the symbols in the detection range, and wherein the variables m,n, and M are integers.

4. The method of claim 1, wherein in the applying differential operations step, the differential operations are applied to the phase rotated output $\widetilde{H_n}$ to generate the plurality of values $H_p^d$ for every symbol.

5. The method of claim 1, wherein in the applying differential operations step, the differential operations $H_p^d$ is calculated as follows:

$H_p^d(m,k) = \widetilde{H_n}(m,k) * \widetilde{H_{p+1}}(m,k)^*,$ where p=0,1, ..., R−2; m=0,1, ..., M−1.

6. The method of claim 1, wherein in the summing step, the summation output $H_{sum}$ is a summation over a range of the plurality of initial phase offsets (m).

7. The method of claim 1, wherein in the summing step, the summation output $H_{sum}$ is calculated as follows:

$H_{sum}(m) = |(\Sigma_{p=0}^{R-2} \Sigma_{k=0}^{N-1} H_p^d(m,k))|,$ where m=0,1, ..., M−1.

8. The method of claim 1, wherein the quality value Q is a function of maximum $|H_{sum}|$.

9. The method of claim 1, wherein the quality value Q=Max($|H_{sum}|$)/SecondMax($|H_{sum}|$).

10. The method of claim 1, wherein if the quality value Q is above the predefined threshold, an index of the initial phase offset of the plurality of initial phase offsets is at Max($|H_{sum}|$).

11. A method for pseudorandom noise ("PN") phase detection of a received signal by a PN phase detector for a digital terrestrial multimedia broadcast ("DTMB") receiver, wherein the received signal has a plurality of frames and each frame of the plurality of frames has a plurality of symbols and each symbol of the plurality of symbols having a PN portion, wherein each PN portion having an initial phase offset designated from a plurality of initial phase offsets (m), comprising the steps of:

selecting a detection range of symbols by the PN phase detector from a frame of the received signal;

applying fast-fourier transform ("FFT") to the PN portion of each of the symbols in the detection range to generate an FFT output $H_n(k)$;

applying phase rotation OFF((m+n)%M) to the FFT output $H_n(k)$ to obtain a phase rotated output $\widetilde{H_n}$ for the PN portion of the symbols in the detection range;

applying differential operations to the phase rotated output $\widetilde{H_n}$ to generate a plurality of values $H_p^d$;

summing the plurality of values $H_p^d$ to generate a summation output $H_{sum}$ over the range of the plurality of initial phase offsets (m);

calculating a quality value Q as a function of the summation output $H_{sum}$; and determining the PN phase offset by the PN phase detector as a function of the quality value Q and a predefined threshold, wherein the variables p,d,m,n,M and k are integers.

12. The method of claim 11, wherein in the applying phase rotation step, the phase rotated output $\widetilde{H_n}$ (m,k) is determined as follows:

$$c_n(m,k) = e^{-j*2*\pi*k*\frac{OFF((m+n)\% \ M)}{N}},$$

where $n = 0, 1, \ldots, R-1$;

$k = 0, 1, \ldots, N-1; m = 0, 1, \ldots, M-1$; and $\widetilde{H_n}(m,k) = H_n(k) * c_n(m,k),$ where $m = 0, 1, \ldots, M-1$;

$n = 0, 1, \ldots, R-1.$ wherein the variables N and R are integers; and wherein the function OFF( ) is a phase rotation.

13. The method of claim 11, wherein in the applying differential operations step, the differential operations $H_p^d$ is calculated as follows:

$H_p^d(m,k) = z,30(m,k) * z,38(m,k)^*,$ where p=0,1, ..., R−2; m=0,1, ..., M−1.

14. The method of claim 11, wherein in the summing step, the summation output $H_{sum}$ is calculated as follows:

$H_{sum}(m) = |(\Sigma_{p=0}^{R-2} \Sigma_{k=0}^{N-1} H_p^d(m,k))|,$ where m=0,1, ..., M−1.

15. The method of claim 11, wherein the quality value Q is a function of maximum $|H_{sum}|$.

16. The method of claim 11, wherein the quality value Q = Max($|H_{sum}|$)/SecondMax($|H_{sum}|$).

17. The method of claim 11, wherein if the quality value Q is above the predefined threshold, an index of the initial phase offset of the plurality of initial phase offsets is at Max($|H_{sum}|$).

18. A method for pseudorandom noise ("PN") phase detection of a received signal by a PN phase detector for a digital terrestrial multimedia broadcast ("DTMB") receiver, wherein the received signal has a plurality of frames and each frame of the plurality of frames has a plurality of symbols and each symbol of the plurality of symbols having a PN portion, wherein each PN portion having an initial phase offset designated from a plurality of initial phase offsets (m), comprising the steps of:

selecting a detection range of symbols by the PN phase detector from a frame of the received signal;

applying fast-fourier transform ("FFT") to the PN portion of each of the symbols in the detection range to generate an FFT output $H_n(k)$;

applying phase rotation OFF((m+n)%M) to the FFT output $H_n(k)$ to obtain a phase rotated output $\widetilde{H_n}$ for the PN portion of the symbols in the detection range, wherein the phase rotated output $\widetilde{H_n}(m,k)$ is determined as follows:

$$c_n(m,k) = e^{-j*2*\pi*k*\frac{OFF((m+n)\% M)}{N}},$$

where $n = 0, 1, \ldots, R-1$;

$k = 0, 1, \ldots, N-1; m = 0, 1, \ldots, M-1$; and $$\widetilde{H_n}(m,k) = H_n(k) * c_n(m,k),$$

where $m = 0, 1, \ldots, M-1$;

$n = 0, 1, \ldots, R-1$;

applying differential operations to the phase rotated output $\widetilde{H_n}$ to generate a plurality of values $H_p^d$ is calculated as follows:

$$H_p^d(m,k) = \widetilde{H_n}(m,k) * \widetilde{H_{p+1}}(m,k)^*,$$

where p=0,1, ..., R-2; m=0,1, ..., M-1;

summing the plurality of values $H_p^d$ to generate a summation output $H_{sum}$ over the range of the plurality of initial phase offsets (m), wherein the summation output $H_{sum}$ is calculated as follows:

$$H_{sum}(m) = |(\Sigma_{p=0}^{R-2}\Sigma_{k=0}^{N-1} H_p^d(m,k))|,$$

where m=0,1, ..., M-1.

calculating a quality value Q as a maximum function of the summation output $H_{sum}$; and determining the PN phase offset by the PN phase detector as a function of the quality value Q and a predefined threshold, wherein the variables p,d,m,n,M and k are integers and wherein the function OFF( ) is a phase rotation.

19. The method of claim 18, wherein the quality value Q=Max($|H_{sum}|$)/SecondMax($|H_{sum}|$).

20. The method of claim 18, wherein if the quality value Q is above the predefined threshold, an index of the initial phase offset of the plurality of initial phase offsets is at Max($|H_{sum}|$).

* * * * *